(12) United States Patent
Rekert et al.

(10) Patent No.: US 11,203,435 B2
(45) Date of Patent: Dec. 21, 2021

(54) FASTENING SYSTEM FOR FASTENING FIXTURES IN A VEHICLE

(71) Applicant: Airbus Operations GmbH, Hamburg (DE)

(72) Inventors: Christian Rekert, Kreetslag (DE); Frank Klive, Kreetslag (DE); Jan Richardson-Busshoff, Kreetslag (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 604 days.

(21) Appl. No.: 16/243,661

(22) Filed: Jan. 9, 2019

(65) Prior Publication Data

US 2019/0233080 A1    Aug. 1, 2019

(30) Foreign Application Priority Data

Jan. 26, 2018    (DE) .......................... 102018101836.3

(51) Int. Cl.
*B64D 11/06*    (2006.01)

(52) U.S. Cl.
CPC ................................. *B64D 11/0696* (2013.01)

(58) Field of Classification Search
CPC .................................................. B64D 11/0696
See application file for complete search history.

(56) References Cited

U.S. PATENT DOCUMENTS

| | | | |
|---|---|---|---|
| 9,083,169 B2 * | 7/2015 | James | F16B 37/045 |
| 2006/0038071 A1 | 2/2006 | Schoene | |
| 2006/0088725 A1 * | 4/2006 | Ruggiero | C22C 32/00 |
| | | | 428/650 |
| 2009/0282655 A1 | 11/2009 | James | |
| 2010/0314494 A1 | 12/2010 | Gasser et al. | |
| 2020/0094969 A1 * | 3/2020 | Werner | B64C 1/20 |

FOREIGN PATENT DOCUMENTS

| | | | |
|---|---|---|---|
| DE | 602005001782 T2 | 4/2008 | |
| DE | 102015120515 A1 | 6/2017 | |
| DE | 20217105138 U1 | 11/2017 | |
| DE | 102016111994 A1 | 1/2018 | |
| DE | 102016111999 A1 * | 1/2018 | ......... B64D 11/0696 |
| EP | 2679497 A1 | 1/2014 | |
| FR | 2972971 A1 | 9/2012 | |

* cited by examiner

*Primary Examiner* — Timothy J Brindley
(74) *Attorney, Agent, or Firm* — Greer, Burns & Crain, Ltd.

(57) ABSTRACT

A fastening system for a vehicle has a rail with a flange, which has a bearing surface, and a crosspiece, which bears the flange, also has an accommodating device, arranged on the crosspiece and has an accommodating bore, arranged parallel to the flange and runs through the crosspiece, further has a barrel nut having a longitudinal axis and a bore, which runs transversely to the longitudinal axis, and additionally has a securing device. The flange has a flange opening directed towards the bore. The position of the bore in the nut is aligned with the flange opening when the nut is in the bore. The securing device fixes the nut along the longitudinal axis in the bore. The securing device or the shape of the nut and/or of the bore fix the nut in a rotationally fixed manner in the bore.

12 Claims, 2 Drawing Sheets

FASTENING SYSTEM FOR FASTENING FIXTURES IN A VEHICLE

CROSS-REFERENCE TO PRIORITY APPLICATION

This application claims the benefit of, and priority to, German patent application number DE 102018101836.3, filed Jan. 26, 2018. The content of the referenced application is incorporated by reference herein.

TECHNICAL FIELD

Embodiments of the subject matter described herein relate generally to a fastening system for fastening fixtures in a vehicle and to a cabin in a vehicle having such a fastening system.

BACKGROUND

Various methods and devices are known for the purpose of fastening fixtures in vehicles. The method and device can be selected in dependence on the type of fixture. In aircraft cabins, use is made, for example, of floor rails, on which certain fixtures can be set down. The floor rails have a unit-spacing profile, and fastening elements which can be connected to the fixtures are accommodated within the unit-spacing arrangement.

It is also possible to provide other structure-mounted fastening points to establish a form-fitting or force-fitting connection with fastening elements. It is, for example, known for so-called barrel nuts to be introduced into accommodating bores of a floor structure and for bolts or screws to be introduced, from the cabin, into a corresponding threaded bore of the barrel nut. It is possible for such barrel nuts to be provided when the vehicle or the cabin is being manufactured, although not all of them are utilized. This achieves a certain level of flexibility in order for it to be possible for certain fixtures to be retrofitted or changed over. However, on account of vibrations which occur during operation or transportation of the vehicle, it is not possible to rule out the situation where the barrel nuts rotate or slip in the accommodating bore, or possibly even drop out of their accommodating mount. Additional effort is then required in order to reach the threaded bore of the barrel nuts from the cabin.

BRIEF SUMMARY

It would be advantageous to have a fastening system which is not just flexible, but is also easy to use. Consequently, the object of the disclosure is to propose a fastening system which is flexible and is easily accessible.

The object is achieved by a fastening system for fastening fixtures in a vehicle which has the features of Independent claim 1. Advantageous embodiments and developments can be gathered from the dependent claims and from the following description.

The disclosure proposes a fastening system for fastening fixtures in a vehicle, the fastening system having an elongate rail with a flange, which has a bearing surface, and a crosspiece, which bears the flange, having an accommodating device, which is arranged on the crosspiece and has an accommodating bore, which is arranged parallel to the flange and runs through the crosspiece, having a barrel nut, which has a longitudinal axis and a threaded bore, which runs transversely to the longitudinal axis, and having a securing device, wherein the flange has an opening, which is directed towards the accommodating bore, wherein the barrel nut and the accommodating bore are dimensioned to correspond to one another, wherein the position of the threaded bore in the barrel nut is designed to be in alignment with the opening in the flange when the barrel nut is located in the accommodating bore, wherein the securing device is designed to fix the barrel nut along the longitudinal axis in the accommodating bore, and wherein the securing device or the shape of the barrel nut and/or of the accommodating bore are designed to fix the barrel nut in a rotationally fixed manner in the accommodating bore with the threaded bore directed towards the opening.

The elongate rail can be a part of a floor structure or of a fuselage structure in general. As an alternative, it is also possible for the rail to be provided in addition to the floor structure or the fuselage structure. The elongate rail can be understood to mean a structure-mounted component which is capable of absorbing loads from fixtures and of introducing the same into the fuselage structure.

The general form of the rail can vary depending on the design. The simplest variant can involve a rail with a T-shaped profile which is formed by a crosspiece and a flange. In the case of profile components, the flange is usually arranged transversely to the crosspiece. The rail can be arranged for example directly beneath a floor of a cabin. The flange here can be oriented parallel to the floor, whereas the crosspiece runs for example perpendicularly to the floor. The flange can be used for positioning or setting down fixtures thereon.

The crosspiece can be understood, in particular, to mean a sheet-like structure which spaces the flange or the flanges apart in relation to a center axis of the rail. The thickness of the crosspiece has no particular bearing on the level of material stressing achieved in the flange, and therefore the crosspiece can be dimensioned such that it remains dimensionally stable when the rail is subjected to loading. The crosspiece can have cutouts or apertures in order to reduce its weight.

It is also possible for the rail to have two flanges, which are arranged on mutually opposite sides of the crosspiece. The flanges can have different dimensions and/or extents in directions transverse and parallel to the crosspiece.

An accommodating device, which has an accommodating bore, is provided on the crosspiece of the rail. The accommodating bore also runs through the crosspiece. The purpose of the accommodating bore is to retain a barrel nut, which can be pushed into the accommodating bore from one side of the crosspiece. The length of the accommodating bore should be adapted here to the length of the barrel nut.

The disclosure provides a securing device, which prevents both rotation of the barrel nut about its longitudinal axis and displacement of the barrel nut along the longitudinal axis. The securing device can be realized by various features which, together, result in the barrel nut being secured as desired. The function of preventing the longitudinal displacement can be realized independently of the rotation-preventing function. However, it is also conceivable for these functions to be linked to one another and to be realized by a single feature.

In the simplest case, the shape of the barrel nut and the shape of the accommodating bore, or of a component adjacent thereto, can be adapted to one another such that the barrel nut establishes a form fit with the accommodating bore, or the adjacent component, such that it cannot rotate. The form fit can be designed such that the barrel nut stops against a shape feature of the accommodating bore, or the adjacent component, and thus cannot be displaced longitudinally at least in one direction. It is also possible for the securing device to have securing rings or similar means which completely prevent longitudinal movement of the barrel nut.

In an advantageous embodiment, the accommodating device is realized in the form of at least one local thickening of the crosspiece. A thickening can be understood to mean a deliberate local increase in material thickness in the region of the crosspiece. It is not absolutely necessary here for the crosspiece to be thickened; rather, it is also conceivable to have add-on bodies, which can be fitted onto the crosspiece and thus create a thickening. The thickening as a whole here should always create space sufficient to provide the accommodating bore.

The thickening can preferably be formed by an angled piece with an L-shaped profile cross section, which has a first limb and a second limb, wherein the angled piece can be brought into surface contact with the crosspiece and the flange and can be connected, with this surface contact, to the rail. The flange and the crosspiece themselves are at an angle to one another and enclose an angle of preferably 90° in relation to one another at least on one side of the crosspiece. The angled piece can be arranged in this region such that one limb of the profile cross section of the angled piece is in contact with the flange, and the other limb is in contact with the crosspiece. This measure allows the angled piece to be produced separately from the rail and to be connected thereto as required. There is therefore no need for the rail, or the manufacturing process thereof, to meet any special requirements.

In a particularly preferred embodiment, the angled piece can have a protrusion, which is arranged on the first limb and extends along the second limb, wherein the accommodating bore is arranged at least to some extent in the protrusion. The protrusion need not extend over the entire angled piece; rather, it can be restricted to a relatively small region which provides the accommodating bore. This results in a weight-optimized arrangement of an accommodating bore by way of a merely partial thickening, which has the accommodating bore passing through it.

In a further-advantageous embodiment of the fastening system, the accommodating device is realized in the form of two thickenings, which are arranged on mutually opposite sides of the crosspiece. The two thickenings can have the same extent on either side of the crosspiece. They can be configured in mirror-inverted form, as seen relative to the crosspiece, the arrangement of the two thickenings therefore being symmetrical overall.

It is possible for the accommodating device to be connected in a non-releasable manner to the rail or to be integrated thereon. In other words, irrespective of the configuration of the accommodating device, the latter can be adhesively bonded or welded to the rail or integrated directly thereon when the rail is being produced. Integration can take place, for example, by virtue of part of the rail being manufactured, this part then being connected to other portions of the rail. Manufacturing can take place by forming, casting or by a generative production process, if the rail consists of a metallic material. If the rail consists of a fiber-reinforced plastic which contains reinforcing fibers in a plastic matrix, the addition of layers of the material and subsequent curing can result in the thickenings, or other kinds of accommodating device, being formed.

In an advantageous embodiment, the securing device has at least one securing ring, which locally reduces a free cross section of the accommodating bore. The securing ring can be arranged, in particular, in a groove in one end of the accommodating bore, in order to reduce the free cross section there such that the barrel nut is prevented from slipping out on this side. It is recommended for a device which prevents the barrel nut from slipping out also to be provided at the other end of the accommodating bore. This need not necessarily be a securing ring. Rather, it is also possible for one end of the accommodating bore to be completely closed and be designed, for example, in the manner of a blind hole, movement along the longitudinal axis therefore being prevented beyond this point.

It is additionally possible for the securing device to have at least one pin, which can be introduced into an aperture of the at least one thickening and can be brought into surface contact with a shape feature of the barrel nut, rotation of the barrel nut in the accommodating bore therefore being prevented. As its shape feature, the barrel nut can have a clearance, a protrusion, a depression or a flattening. The purpose of the pin is for the pin to be structure-mounted and, by way of surface contact with the relevant shape feature, to retain the latter in a structure-mounted position. For this purpose, the shape feature should be spaced apart from the longitudinal axis of the barrel nut if the longitudinal axis coincides with the center axis of the accommodating bore. It is conceivable to provide, in the accommodating device, an appropriate transverse bore, into which a pin can be inserted. Once the barrel nut has been introduced into the accommodating bore, and oriented therein, it is therefore possible to insert the pin, in order to retain the desired rotary position.

The barrel nut preferably has a profile cross section, running perpendicularly to the longitudinal axis, which is in the form of a circle which, at least in certain regions, is flattened at least on one side. Consequently, the profile cross section of the barrel nut is based on the shape of a circle which is flattened on at least one side. This results, in particular, in a profile cross section in the form of a circle segment. Rather than having to extend over the entire barrel nut, the flattening can preferably be provided exclusively at at least one longitudinal end. The barrel nut could be produced from a cylindrical workpiece, material being removed, for example by milling, on one side of the profile cross section. The resulting flattening can be brought into surface contact with a securing device, in order to prevent rotation.

Preferably at least in certain regions, the accommodating bore has a cross section, running perpendicularly to the longitudinal axis, which is in the form of a circle which is flattened at least on one side, wherein the bore cross section is adapted to the profile cross section of the barrel nut. This makes it possible for the accommodating bore itself to prevent the rotation of the barrel nut as a result of appropriate shaping. The barrel nut can be inserted into the accommodating bore by way of its flattened profile cross section.

The disclosure also relates to a cabin for a vehicle, having at least one fastening system according to the above description. The elongate rail here can be integrated, in particular, into a floor of the cabin such that the flange of the rail terminates flush with a floor surface which projects into an interior of the cabin. This can involve, in particular, a floor panel onto which an appropriate floor cover can be applied.

The disclosure further relates to a vehicle having such a cabin.

The vehicle can be, in particular, an aircraft. Of course, the fastening system according to the disclosure can also be applied to all other vehicles or means of transport which have a cabin for accommodating passengers.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the present invention can be gathered from the following description of the exemplary embodiments and from the figures. All the features described and/or illustrated in the figures here form the subject matter of the disclosure individually and in any desired combination, even irrespective of how they are put together in the individual claims or of the dependency references thereof. Furthermore, in the figures, identical reference signs denote identical or similar objects. In the figures:

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
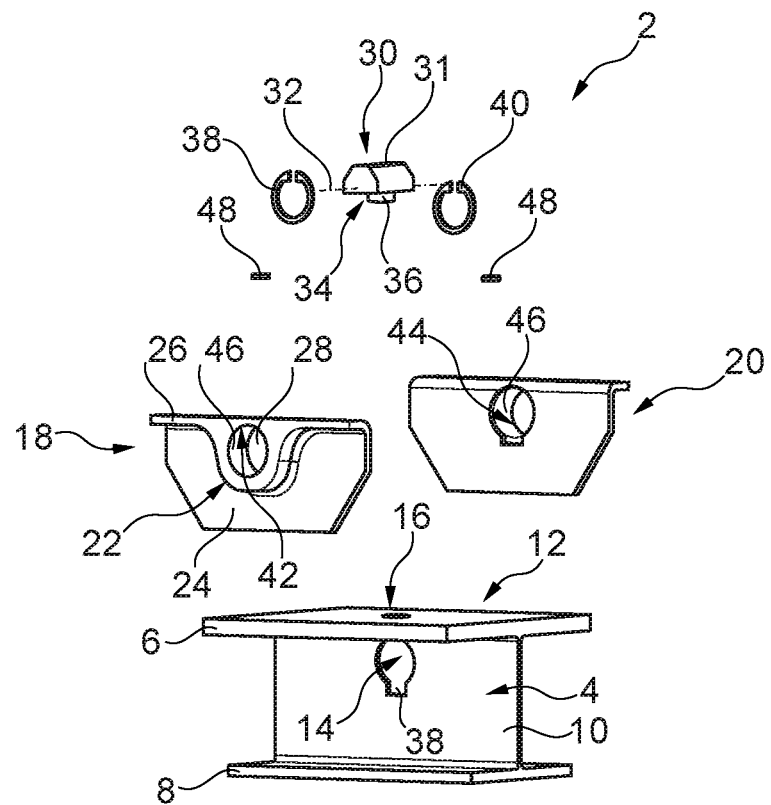
FIG. 1 shows an exploded illustration of an exemplary embodiment of a fastening system.

FIG. 1 shows an exploded illustration of a fastening system 2. An elongate rail 4, which for the sake of simplicity has been illustrated only in part, has a first flange 6, a second flange 8 and a crosspiece 10, which is located between the flanges. The first flange 6 has a greater width than the second flange 8. It also has a bearing surface 12, which is directed away from the second flange 8 and on which can be positioned fixtures which are to be fastened. The crosspiece 10 can have a lesser material thickness than the two flanges 6 and 8. It is preferably the case that the flanges 6 and 8 are oriented parallel to one another and the crosspiece 10 runs perpendicularly to each. The rail is therefore, by way of example, in the form of a double T.

The rail 4 can be produced from a metallic material, for example by rolling or by virtue of the flanges 6, 8 and the crosspiece 10 being produced separately and joined together. As an alternative to this, production from a fiber-reinforced plastic is also conceivable. In this case, reinforcing fibers are incorporated in a matrix made of a plastic material, which may be a thermosetting plastic or a thermosoftening plastic.

The crosspiece 10 has a through-opening 14, which extends into an opening 16 in the first flange 6, directly above the crosspiece 10. A correspondingly shaped fastening element can consequently be inserted into the flange opening 16 and then projects into the crosspiece opening 14, beneath the first flange 6.

On a side of the crosspiece 10 which is directed towards the first flange 6, it is possible for angled pieces 18 and 20 to be arranged on either side of the crosspiece 10. These angled pieces each have a protrusion 22, which is located on a first limb 24 and extends part of the way along a region of a second limb 26.

The first limb 24 is designed in the form of a surface-area portion, which can be positioned on the crosspiece 10. The second limb 26 is located preferably perpendicularly to the first limb 24 and has a smaller surface-area extent than the first limb 24. It is therefore possible for the angled piece 18 or 20 to be arranged on the crosspiece 10 and on an underside of the first flange 6. The angled pieces 18 and 20 result in a local thickening of the crosspiece 10.

The two angled pieces 18 and 20 each have a bore 28. Once the angled pieces 18 and 20 have been arranged on the rail 4, the bores 28 and the crosspiece opening 14 can be brought into alignment, an accommodating bore being formed as a result. The angled pieces 18 and 20 each form part of an accommodating device, as will be explained in more detail hereinbelow.

The angled pieces 18 and 20 can be connected to the rail 4 by adhesive bonding, welding or other connection methods. It is conceivable for the rail 4 to be formed with a plurality of crosspiece openings 14 and flange openings 16 and to be provided with angled pieces 18 and 20 at the appropriate positions.

FIG. 1 also shows a barrel nut 30, which is dimensioned for introduction into the bore 28 and the crosspiece opening 14. The barrel nut 30 has a profile cross section, running perpendicularly to a longitudinal axis 32, which is based on the shape of a circle and is flattened in a region 34. In addition, a protrusion 36, which corresponds with an aperture 38 in the crosspiece opening 14, is provided in the flattening. This makes it possible to prevent rotation of the barrel nut 30 in the accommodating bore at least when the barrel nut 30 is positioned centrally.

In order to accommodate a connecting element, the barrel nut 30 has a threaded bore 31, which runs transversely to the longitudinal axis 32 of the barrel nut. Said threaded bore extends preferably all the way through the barrel nut 30. When the connecting element and the barrel nut 30 are being screw-connected, the barrel nut is pushed onto a side of the respective bore 28 which is directed towards the first flange 6, and therefore the second limbs 26 of the angled pieces 18 and 20 press against an underside of the first flange 6.

Two securing rings 38 and 40 are provided, it being possible for each of these to be introduced into an inner groove 42 and 44 of a respective angled piece 18 and 20. This makes it possible to block the position of the barrel nut 30 along its longitudinal axis 32 when the barrel nut 30 is seated in the accommodating bore.

In addition, the protrusions 22 each have bores 46, into which pins 48 can be inserted. The position of the bores 46 is selected such that the pins 48 are located beneath the flattened region 34 of the barrel nut 30, and therefore the orientation of the barrel nut 30 in the accommodating bore is additionally fixed as result.

Figure 2:
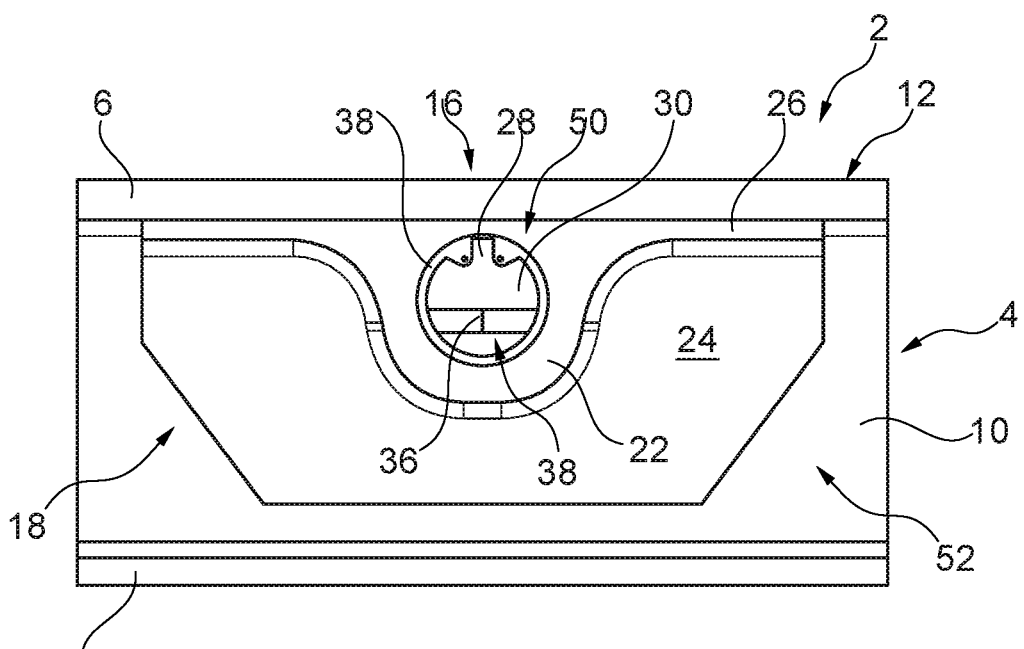
FIG. 2 shows a side view of the fastening system from FIG. 1 in an assembled state.

FIG. 2 shows a side view of an assembled variant of the fastening system 2. The barrel nut 30 has been inserted into the accommodating bore 50, which extends from the angled piece 18 to the angled piece 20, which is arranged on the opposite side of the crosspiece 10. The securing ring 38 has been inserted in the groove 42 (not visible here) and prevents the barrel nut 30 from passing out of the bore 28 (visible in the plane of the drawing) of the angled piece 18.

The angled pieces 18 and 20 are, by way of example, adhesively bonded or welded to the rail 4. Even if the barrel nut 30 is not used, but rather is merely arranged in an accommodating device 52 provided by the angled pieces 18 and 20, it can be secured against rotation and slipping out.

The securing rings 38 and 40 and also the pins 48 can be understood together, within the context of the disclosure, to mean a securing device.

Figure 3:
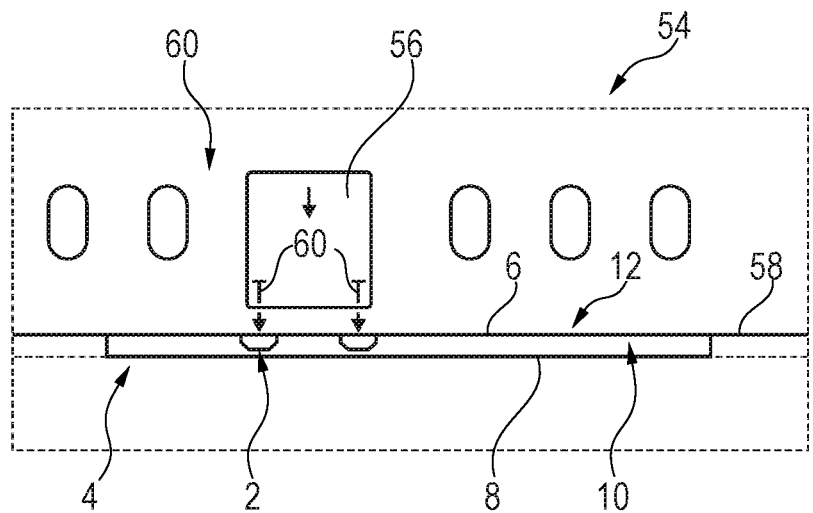
FIG. 3 shows a detail of a passenger cabin with a monument, which is to be fastened on a floor.

FIG. 3 shows a detail of a passenger cabin 54, which is arranged for example in an aircraft. A monument 56 is provided so as to be fastened on a floor 58 in the passenger cabin 54. The previously explained elongate rail 4 is arranged beneath the floor 58. The first flange 6 with the bearing surface 12 is positioned flush with the floor 58, and therefore the monument 56 stands on the floor 58 and can be fastened on the rail 4. Two connecting elements 60, which can be for example screws, bolts or the like, are shown merely for illustrative purposes. These connecting elements are each guided through an opening or a cutout in the structure of the monument 56 in order then to be moved, through the flange opening 16, into the threaded bore 31 of the barrel nut 30. The barrel nut 30 can be oriented and secured by the securing device during production of the passenger cabin 54, and therefore the threaded bore 31 can always be reached from an interior 62, which is located above the floor 58.

Figure 4:
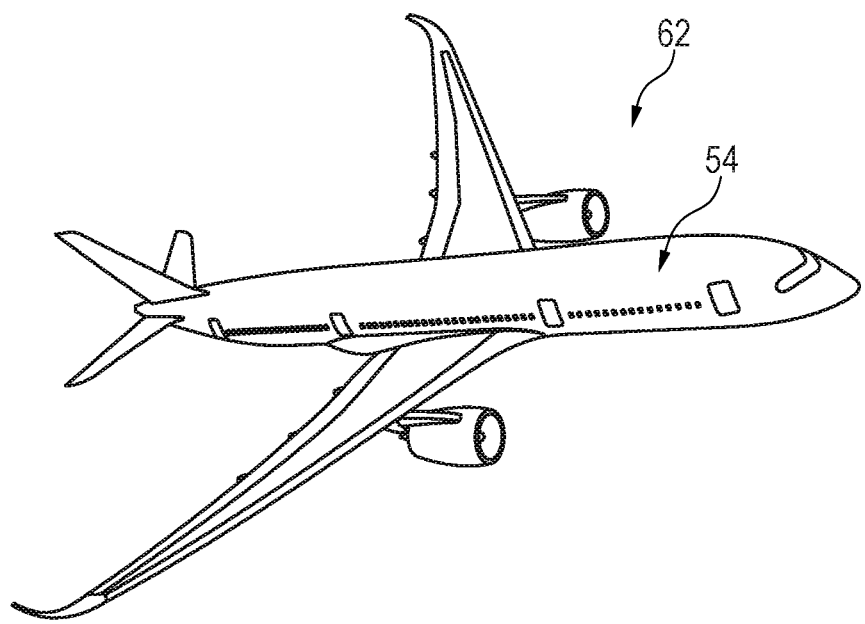
FIG. 4 shows an aircraft having such a passenger cabin.

FIG. 4, finally, shows an aircraft 62 which is equipped with a passenger cabin 54 and a plurality of monuments 56 located therein, the monuments being fastened therein via at least one fastening system 2.

It should additionally be pointed out that "having" does not rule out any other elements or steps, and "a", "an" or "one" do not rule out a multiplicity. It should also be pointed out that features which have been described with reference to one of the above exemplary embodiments can also be used in combination with other features of other exemplary embodiments described above. Reference signs in the claims should not be regarded as being limiting.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fastening system for fastening fixtures in a vehicle, the fastening system comprising:
    an elongate rail with a flange, which has a bearing surface, and a crosspiece, which bears the flange;
    an accommodating device arranged on the crosspiece and having an accommodating bore, which is arranged parallel to the flange and runs through the crosspiece;
    a barrel nut, which has a longitudinal axis and a threaded bore, which runs transversely to the longitudinal axis; and
    a securing device;
    wherein the flange has a flange opening directed towards the accommodating bore;
    wherein the barrel nut and the accommodating bore are dimensioned to correspond to one another;
    wherein positioning of the threaded bore in the barrel nut is in alignment with the flange opening when the barrel nut is located in the accommodating bore;
    wherein the securing device fixes configured to fix the barrel nut along the longitudinal axis in the accommodating bore; and
    wherein the securing device, the shape of the barrel nut, and/or of the accommodating bore are configured to fix the barrel nut in a rotationally fixed manner in the accommodating bore with the threaded bore directed towards the flange opening.

2. The fastening system of claim 1, wherein the accommodating device is realized as at least one local thickening of the crosspiece.

3. The fastening system of claim 2, wherein:
    the thickening is formed by at least one angled piece with an L-shaped profile cross section, which has a first limb and a second limb; and
    the angled piece is configured to contact the crosspiece and the flange to be connected to the rail.

4. The fastening system of claim 3, wherein:
    the angled piece has a protrusion arranged on the first limb and extending along the second limb; and
    the accommodating bore is arranged at least to some extent in the protrusion.

5. The fastening system of claim 2, wherein the accommodating device is realized in the form of two thickenings arranged on mutually opposite sides of the crosspiece.

6. The fastening system of claim 1, wherein the accommodating device is connected in a non-releasable manner to the rail, or is integrated thereon.

7. The fastening system of claim 1, wherein the securing device has at least one securing ring to locally reduce a free cross section of the accommodating bore.

8. The fastening system of claim 1, wherein the securing device has at least one pin, which can be introduced into an aperture of the at least one thickening and can be brought into surface contact with a shape feature of the barrel nut, to prevent rotation of the barrel nut in the accommodating bore.

9. The fastening system of claim 1, wherein the barrel nut has a profile cross section, in a region, running perpendicularly to the longitudinal axis, which is in the form of a circle which is flattened at least on one side.

10. The fastening system of claim 9, wherein the accommodating bore has a cross section, running perpendicularly to the longitudinal axis, which is in the form of a circle which is flattened at least on one side, wherein the bore cross section is adapted to the profile cross section of the barrel nut.

11. A passenger cabin for a vehicle, comprising the fastening system of claim 1.

12. A vehicle comprising the passenger cabin of claim 11.

* * * * *